(12) United States Patent
Guillot et al.

(10) Patent No.: US 11,055,163 B2
(45) Date of Patent: Jul. 6, 2021

(54) METHOD AND DEVICE FOR ERROR HANDLING IN A COMMUNICATION BETWEEN DISTRIBUTED SOFTWARE COMPONENTS

(71) Applicant: Robert Bosch GmbH, Stuttgart (DE)

(72) Inventors: Lou Guillot, Stuttgart (DE); Peter Haefele, Schemmerhofen (DE); Simon Kramer, Leonberg (DE); Uwe Hartmann, Gerlingen (DE); Venugopalan Ranjith Kumar, Tamilnadu (IN)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 16/379,131

(22) Filed: Apr. 9, 2019

(65) Prior Publication Data

US 2019/0310907 A1 Oct. 10, 2019

(30) Foreign Application Priority Data

Apr. 10, 2018 (DE) .......................... 102018205390.1

(51) Int. Cl.
*G06F 11/07* (2006.01)
*G06F 9/48* (2006.01)

(52) U.S. Cl.
CPC ........ *G06F 11/0757* (2013.01); *G06F 9/4887* (2013.01); *G06F 11/0721* (2013.01); *G06F 2201/805* (2013.01)

(58) Field of Classification Search
CPC ............. G06F 11/0709; G06F 11/0757; G06F 11/0793; G06F 13/24; G06F 13/28; G06F 9/4887; G06F 9/544; G06F 11/0715; G06F 11/3017; G06F 11/302; G06F 9/54
See application file for complete search history.

(56) References Cited

U.S. PATENT DOCUMENTS

| 6,567,840 B1 * | 5/2003 | Binns .................... G06F 9/4887 718/103 |
| 7,848,359 B2 * | 12/2010 | Pree ........................ H04L 67/10 370/498 |
| 10,552,215 B1 * | 2/2020 | Xu .......................... G06F 9/526 |
| 2003/0078954 A1 * | 4/2003 | Haughey ............... G06F 9/4881 718/102 |

(Continued)

*Primary Examiner* — Bryce P Bonzo
*Assistant Examiner* — Michael Xu
(74) *Attorney, Agent, or Firm* — Norton Rose Fulbright US LLP; Gerard Messina

(57) ABSTRACT

For error handling of data communications, in a transmission interval, between first and second tasks for which first and second time intervals are respectively predefined, (1) execution of the first task is omitted in a pending instance of the second time interval responsive to where the transmission interval immediately prior to the pending instance of the second time interval began in, and continued past an end point of, a most recent instance of the first time interval, which was during an immediately preceding instance of the second time interval; or (2) execution of the second task is omitted in the pending instance of the second time interval responsive to where a most recent prior execution of the second task began in, and continued past an end point in time of, a most recent instance of the second time interval immediately prior to the pending instance of the second time interval.

18 Claims, 7 Drawing Sheets

(56) References Cited

U.S. PATENT DOCUMENTS

| | | | |
|---|---|---|---|
| 2013/0104137 A1* | 4/2013 | Fukuzaki | G06F 9/4887 718/102 |
| 2013/0117750 A1* | 5/2013 | Howes | G06F 9/522 718/102 |
| 2014/0244944 A1* | 8/2014 | Mortier | G06F 9/544 711/147 |
| 2014/0258703 A1* | 9/2014 | Vanturennout | G06F 9/4406 713/100 |
| 2016/0055032 A1* | 2/2016 | David | G06F 11/0793 718/107 |
| 2016/0246647 A1* | 8/2016 | Harris | G06F 9/5027 |
| 2016/0314032 A1* | 10/2016 | Sengupta | G06F 11/0793 |
| 2018/0081733 A1* | 3/2018 | Nandan | G06F 9/52 |
| 2018/0143606 A1* | 5/2018 | Kawanoue | G05B 19/05 |
| 2019/0121641 A1* | 4/2019 | Knowles | G06F 9/462 |
| 2019/0121785 A1* | 4/2019 | Wilkinson | G06F 15/17325 |
| 2020/0104172 A1* | 4/2020 | Nasu | G06F 9/52 |
| 2020/0257563 A1* | 8/2020 | Subbaramaiah | G05B 19/042 |

\* cited by examiner

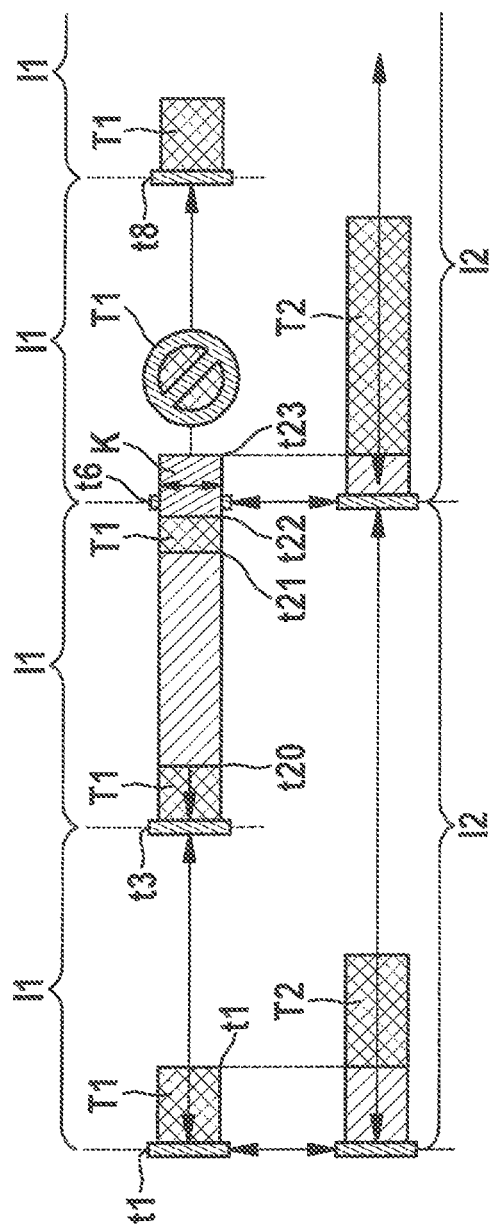

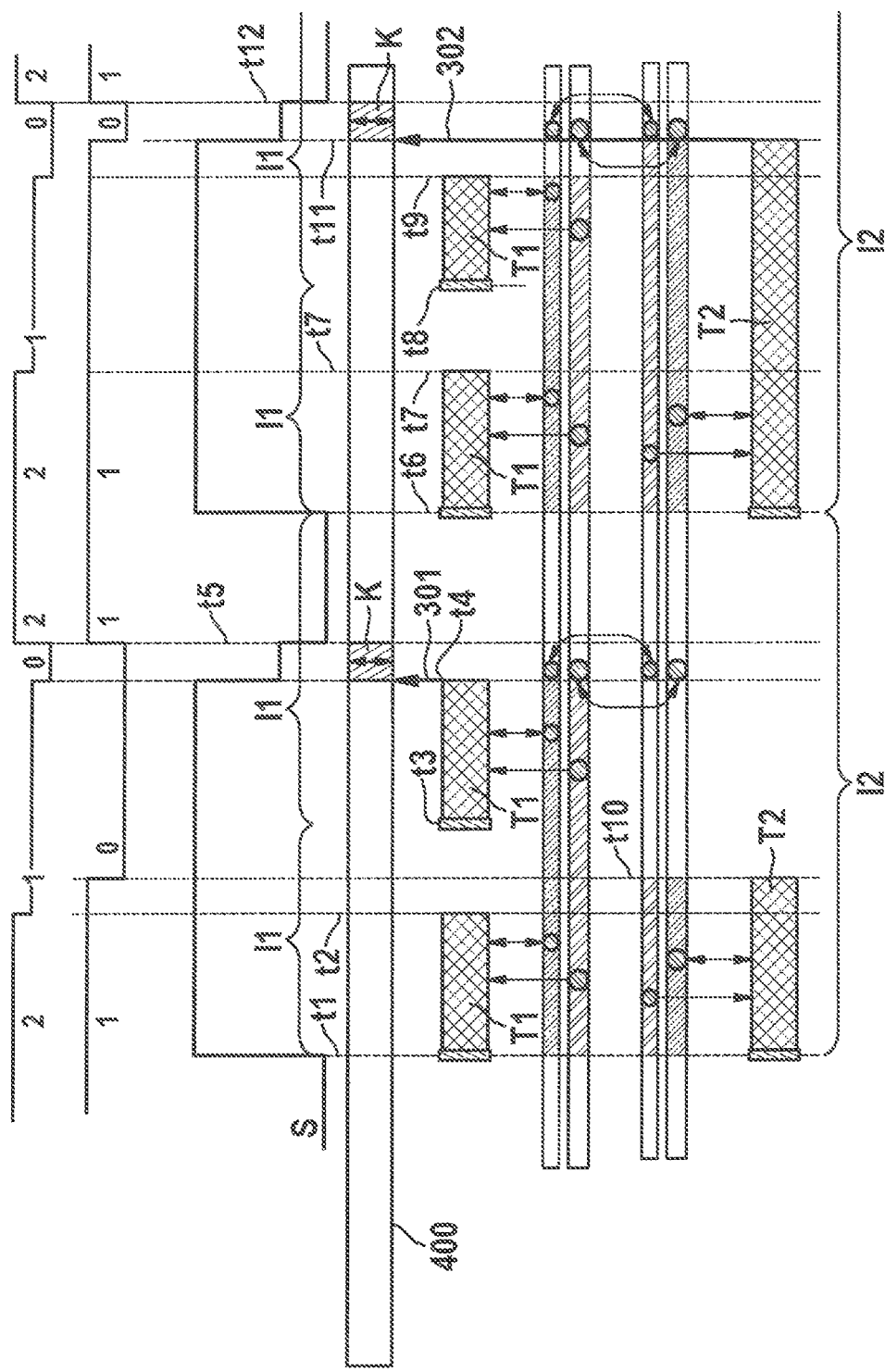

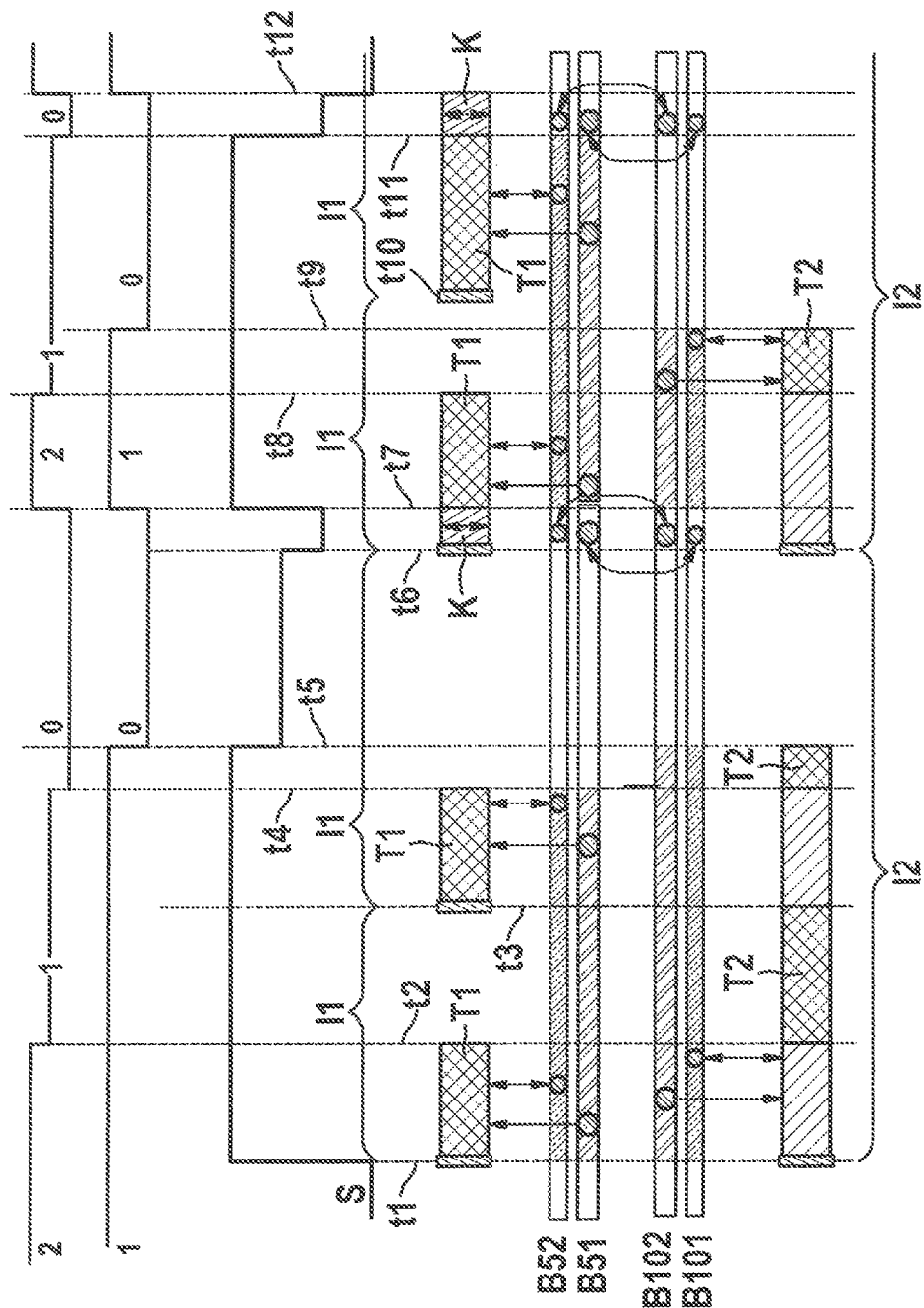

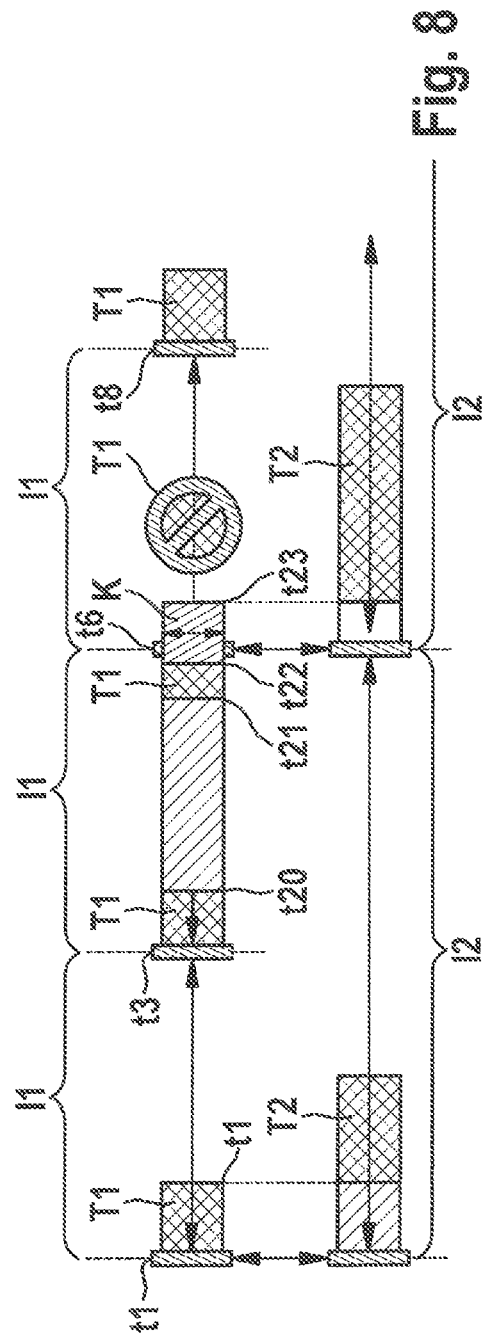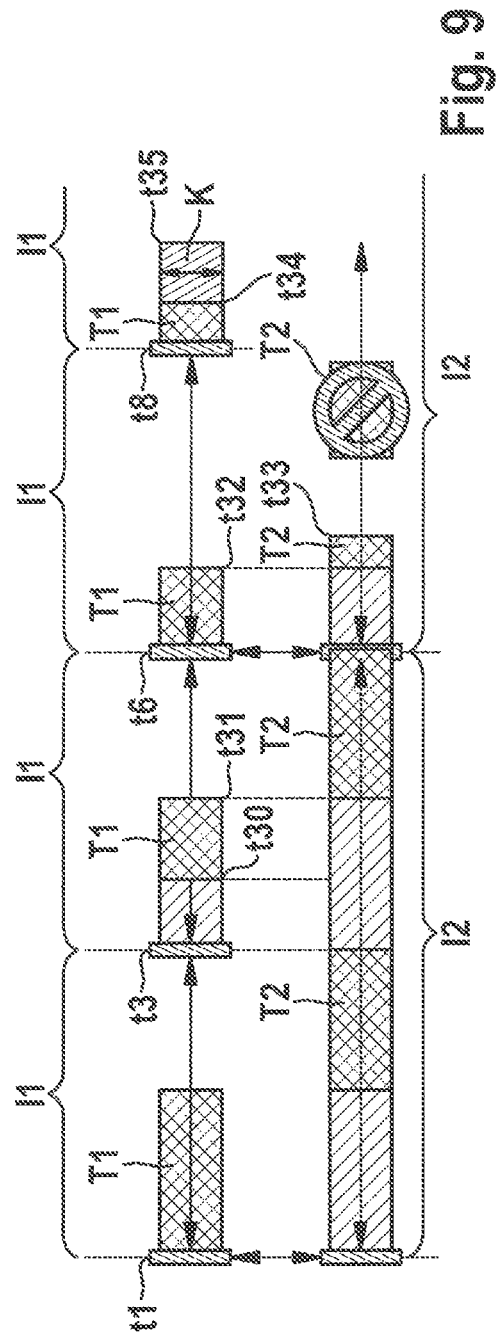

METHOD AND DEVICE FOR ERROR HANDLING IN A COMMUNICATION BETWEEN DISTRIBUTED SOFTWARE COMPONENTS

CROSS-REFERENCE TO RELATED APPLICATIONS

The present application claims priority under 35 U.S.C. § 119 to DE 10 2018 205 392.8, filed in the Federal Republic of Germany on Apr. 10, 2018, the content of which is hereby incorporated by reference herein in its entirety.

FIELD OF THE INVENTION

The present invention relates to a method, device. computer program, and/or computer program product for error handling in a communication between software components distributed over two or more tasks, which in particular are executed in time intervals having different predefined cycle times.

BACKGROUND

As the result of errors, the end of a cycle time, i.e., a time interval, can be reached before a task, whose result is to be transferred to another task at the end of the time interval, has ended. Deterministic error handling is desirable for these types of errors.

SUMMARY

This is achieved according to the present invention.

An example embodiment of the present invention is directed to a method for error handling in a communication in which data to be communicated are communicated between a first task and a second task in a data transmission interval by reading from a first data area for temporary data storage and storing the read data in a second data area for temporary data storage. One communication interval is specified for executing the first task, and one communication interval is specified for executing the second task. Either (a) a first execution of the first task in a communication interval is omitted when a data transmission interval immediately prior to the communication interval began in a most recent time interval of a communication interval immediately preceding the communication interval and is continued past an end point in time of this most recent time interval, or (b) an execution of the second task in a communication interval is omitted when an execution of the second task immediately preceding this second task began in a communication interval immediately preceding the communication interval and is continued past an end point in time of the preceding communication interval.

The time interval and the communication interval are logical intervals of a scheduler that are based on fixed time slices and cannot be shifted. However, the stated implementation of the scheduler does not enforce compliance with the logical intervals, but, rather, considers an actual interval as concluded only when the scheduler has also actually carried out a task execution in a new interval that immediately follows this actual interval. Deterministic communication is thus possible even with load peaks, which impair a computing system in such a way that tasks cannot continue to an end of a logical interval that is associated with them for their execution. This allows efficient error handling, with different specific details as a function of categories with different predefined, static task distribution and task scheduling. This is an effective error handling concept for a sporadic failure of task executions.

The start of the data transmission interval is preferably triggered by the end of an execution of the first task when the execution of the first task ends later than an execution of the second task, or the start of the data transmission interval is triggered by the end of an execution of the second task when the execution of the second task ends later than an execution of the first task.

When an execution of the first task continues past an end of a communication interval in which the execution of the first task began, and when the start of the data transmission interval is triggered by the end of the execution of the first task, an execution of the second task immediately following the execution of the first task is preferably delayed until the end of the data transmission interval. As a result, no inconsistent data occur.

When an execution of the second task continues past an end of the communication interval in which the execution of the second task began, and when the start of the data transmission interval is triggered by the end of the execution of the first task, triggering of the data transmission interval in this communication interval preferably does not take place. As a result, no inconsistent data occur.

The data to be communicated in the data transmission interval are preferably communicated by one or multiple entities outside hardware for execution of the first task and of the second task. Transferring the communication task to one or multiple entities ensures deterministic processing by direct memory access (DMA) or interrupt service routines (ISRs), for example.

The stated error handling concepts ensure that data consistency is guaranteed at all times. Transactions for communication or executions of tasks are dispensed with only when the data consistency otherwise can no longer be ensured. The error handling concepts allow a reduction in the system load due to the failure of individual task executions and the failure of individual transactions for increasing robustness of the overall system. The error handling concepts can access scheduling information in order to recognize runtime errors as multiple process activations.

A duration of the communication interval is preferably an integral multiple of a duration of the time interval, a communication interval including multiple time intervals, with an earliest of the multiple time intervals beginning simultaneously with the communication interval. The logical intervals are thus synchronous.

At least one time interval preferably begins during a communication interval, with time intervals not overlapping in time, the data transmission interval either ending in the earliest of the time intervals prior to a first execution of the first task, or beginning in the latest of the time intervals after the end of a most recent execution of the first task. Cooperative scheduling ensures that the communication is fully concluded before the first task execution takes place in the new interval. In the preemptive scheduling, the scheduler ensures that no interruption takes place by the involved processes, and processes with lower priority are suppressed as necessary.

A status variable is preferably determined as a function of a first state of the execution of the first tasks and as a function of a second state of the execution of the second tasks, the data transmission interval being started as a function of a value of the status variables. The status variable is determined, for example, using a first counter content of a first state counter for the first state and using a second counter content of a second state counter for the second state.

The first state counter is advantageously corrected when one of the first tasks in a communication interval fails because one of the first tasks that is to run during the communication interval, with the exception of the last of the first tasks that are to run during the communication interval, is not ended at the end of the first time interval associated with it, and an execution of a first task therefore fails, the first state counter being corrected to a state that the first state counter would have during execution of the failed first task.

A status variable is advantageously determined as a function of priorities that are associated with the first task and the second task, and when the task that is associated with the lowest priority is executed as the last task in one of the communication intervals, a start of a data transmission interval that immediately follows an end of the task having the lowest priority is shifted into an immediately following communication interval. A task having the highest priority is activated in the time interval first, or at the same time as other tasks. A task having the lowest priority is continued even when the communication interval is over. The communication subsequently takes place in the data transmission interval.

With regard to the device for error handling in a communication, a processor and at least one temporary data memory are provided, which are designed for communicating data to be communicated between a first task and a second task, according to one of the methods, in a data transmission interval by reading from a first data area of the at least one temporary data memory, and storing the read data in a second data area of the at least one temporary data memory.

The device advantageously includes a module for communicating the data to be communicated using a direct memory access (DMA) or using interrupt service routines.

Further example embodiments result from the following description and the drawings.

BRIEF DESCRIPTION OF THE DRAWING

FIG. 2 schematically shows a first error handling concept according to an example embodiment of the present invention.

FIG. 3 schematically shows a second error handling concept according to an example embodiment of the present invention.

FIG. 4 schematically shows a second time-controlled behavior of tasks according to an example embodiment of the present invention.

FIG. 7 schematically shows a third time-controlled behavior of tasks according to an example embodiment of the present invention.

FIG. 8 schematically shows a fifth error handling concept according to an example embodiment of the present invention.

FIG. 9 schematically shows a sixth error handling concept according to an example embodiment of the present invention.

DETAILED DESCRIPTION

Figure 1:
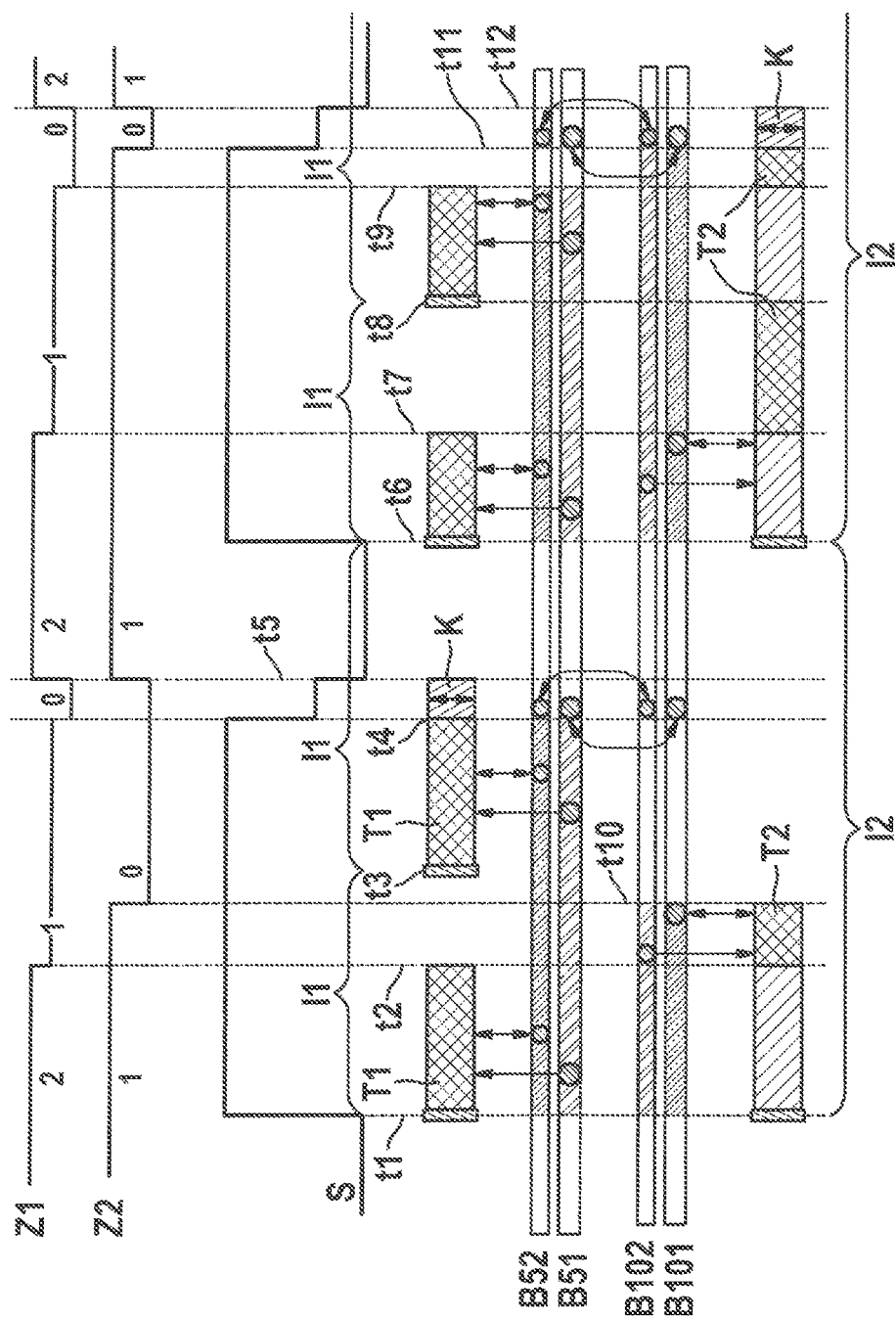
FIG. 1 schematically shows a first time-controlled behavior of tasks according to an example embodiment of the present invention.

A task is, for example, a computer program at runtime, whose execution is dynamically controlled by the operating system via certain actions. Tasks are managed by a task controller of the operating system, also referred to as a scheduler. The task controller can either have a task computed until it ends, or can ensure that the task that is running at the moment is interrupted in each case after a short period of time. The task controller can thus change back and forth between various active tasks. Tasks can have different lengths and can start at different points in time.

For a temporal execution of tasks, recurring time intervals for a cyclical execution of a first task and recurring time intervals for a cyclical execution of a second task are provided in the task controller. In the example, a duration of the time interval for the second tasks is longer than a duration of the time interval for the first tasks. For example, the time interval for the first tasks has a length of 5 ms, and the time interval for the second tasks has a length of 10 ms. The time intervals are logical intervals of the scheduler that are based on fixed time slices and cannot be shifted.

Software components in tasks can exchange data among one another. For communication between the tasks, the data can be buffered in temporary data memories, in particular buffers. For the communication, for example data to be communicated are communicated between the first task and the second task in a data transmission interval by reading from a first buffer and storing the read data in a second buffer. In the example, a first channel with a first 5 ms buffer for read-only access and a second 5 ms buffer for read and write access is associated with the first task. In the example, a second channel with a first 10 ms buffer for read-only access and a second 10 ms buffer for read and write access is associated with the second task. For a number of n tasks, n channels with 2n such buffers can generally be provided.

The implementations of the scheduler stated with reference to the following examples do not enforce compliance with the logical intervals, but, rather, consider an actual interval as concluded only after the scheduler has also actually carried out a task execution in a new interval that immediately follows this actual interval.

For the error handling in a communication between tasks, the error cases are generally classifiable as indicated below.

Scheduling Errors:
a) schedule is incomplete or is not deterministic
b) task is not activated (has been omitted)
c) task is spontaneously activated
d) buffers of a channel are used before their initialization Load-Dependent Errors:
a) task end is exceeded (for multiple task activation)
b) communication was not ended in the most recent data transmission interval
c) communication was not carried out in the most recent data transmission interval Memory Errors:
a) channel is in a damaged state.

Scheduling errors (a)-(c) can be recognized only using an external time reference, for example by a clock or a counter.

The other errors can be reliably recognized using a channel state machine. The following examples describe details of a communication method, and error recognition and error correction based on this channel state machine.

An algorithm that selects the communication method and/or the error handling concept in a computing system based on the scheduling information uses a task-to-core association, a scheduling type, for example preemptive or cooperative, and a priority of the tasks involved in a communication and a possible sequential execution by an activation pattern in the system.

A "concurrency level" category is ascertained. A communication method and/or a corresponding error handling concept are/is associated with the category.

The following are possible categories of the concurrency level:
 Cooperative core local: the tasks involved in the communication include exclusively cooperative scheduling and are executed on the same processor core.
 Preemptive core local: the tasks involved in the communication include preemptive scheduling and are executed on the same processor core.
 Parallel cross core: tasks are executed on at least two processor cores.
 Sequential core local: the tasks are executed sequentially on the same processor core.
 Sequential cross core: the tasks are executed sequentially on at least two processor cores.

An example communication method for a communication in the "cooperative core local" category is described with reference to FIG. 1. The communication method allows a distribution of the communication load over all involved tasks. The communication behavior allows efficient deterministic communication in a real-time system. In the process, a status variable S is used for determining communication points in time. Status variable S can assume one of the following states, which are also referred to below as phases of the status variable:
 PROC_ACTIVE: at least one of the involved tasks uses the data provided in the buffers. Overwriting the read buffers is not permitted for consistency reasons.
 PROC_COMPLETE: all tasks have concluded the required number of activations in a logical interval (taking into account possible error scenarios), and the provided data are no longer needed in this logical interval.
 TRANS_ACTIVE: the read buffers of the individual tasks are updated. A computation using the contained data is not permitted for consistency reasons.
 TRANS_COMPLETE: the updating of the buffers is concluded. The data can be used for computations. However, no task is active.

In a communication interval, status variable S runs through states PROC_ACTIVE, PROC_COMPLETE, TRANS_ACTIVE, TRANS_COMPLETE, in this sequence. States PROC_COMPLETE and TRANS_COMPLETE can be skipped. A data transmission interval K is to be executed in each communication interval. During data transmission interval K, write and/or read access are/is made to the buffers for updating same. The communication interval, as described in the following examples, is defined synchronously with respect to the logical intervals of the scheduler. In the described examples, status variable S is always set to state PROC_ACTIVE when at least one task is executed. Status variable S is set to state TRANS_ACTIVE during data transmission intervals K. State PROC_COMPLETE is set after conclusion of all executions of a communication interval. State TRANS_COMPLETE is not set until after the end of the data transmission interval.

For a periodically occurring communication, communication interval I2 is computed as least common multiple KGV of intervals T1, T2, . . . , Tn that are to communicate with one another.

Tn refers to an interval of a task n. The logical intervals are defined as running synchronously with the period of the individual tasks. Tasks are activated by the scheduler. All tasks should have run, and data transmission interval K should have elapsed, by the end of communication interval I2. Deadlines by which the tasks must be ended are associated with each of the tasks. If a computation of a task after its activation cannot be ended at the right time prior to the deadline associated with this task, a subsequent activation of this task by the scheduler does not take place. The error handling for the communication is necessary if the computation of the task after its activation is ended at the right time prior to the deadline associated with this task, but data transmission interval K provided in this communication interval I2 is not ended.

For the example from FIG. 1, the following applies for the communication interval:
 I2=KGV (10 ms, 5 ms)=10 ms.

Other common multiples can be used instead of least common multiple KGV.

A description is provided below, with reference to FIG. 1, of how phases of status variables S are sequentially run through. Status variable S is determined as a function of a first state of the execution of the first tasks and as a function of a second state of the execution of the second tasks.

The communication takes place in data transmission interval K, which is started as a function of a value of status variables S.

Status variable S is determined for the first state, for example, using a first counter content of a first state counter Z1, and for the second state, using a second counter content of a second state counter Z2. The first state counter can assume the states 2, 1, 0, as illustrated in FIG. 1. The second state counter can assume the states 1, 0, as illustrated in FIG. 1.

First state counter Z1 begins with first counter content 2 in the time sequence illustrated at the left in FIG. 1. A first execution of a first task T1 begins at a point in time t1 that starts synchronously with first logical interval I1. The first counter content is set to 1 at a point in time t2 at the end of the first execution of first task T1. A second execution of first task T1 begins at a point in time t3 that starts synchronously with the first repetition of first logical interval I1. The first counter content is set to 0 at a point in time t4 at the end of the second execution of first task T1.

Data transmission interval K is subsequently started at point in time t4. Data transmission interval K ends at point in time t5. The first counter content is set to 2 at point in time t5.

A second and a third repetition of first logical interval I1 are likewise illustrated in FIG. 1. In the second repetition, a third execution of first task T1 begins synchronously with the second repetition of first logical interval I1 at a point in time t6, and ends at a point in time t7. The first counter content is set from 2 to 1 at point in time t7.

In the third repetition, a fourth execution of first task T1 begins synchronously with the third repetition of first logical interval I1 at a point in time t8, and ends at a point in time t9. The first counter content is set from 1 to 0 at point in time t9.

Second state counter Z2 begins with second counter content 1 at the left in FIG. 1. Second logical interval I2 begins synchronously with first logical interval I1 at point in time t1. The first execution of a second task T2 begins after the end of first execution of first task T1 at point in time t2. This means that first task T1 is processed as second task T2 between point in time t1 and point in time t2.

The first execution of second task T2 ends at a point in time t10, prior to point in time t3 in the example. The second counter content is set from 1 to 0 at point in time t10. The second counter content is set from 0 to 1 at the end of data transmission interval K, i.e., at point in time t5.

A repetition of second logical interval I2 is likewise illustrated in FIG. 1. The repetition of second logical interval I2 begins synchronously with the third repetition of first logical interval I1 at point in time t6. The second execution of a second task T2 begins after the end of the third execution of first task T1 at point in time t7. This means that first task T1 is processed as second task T2 between point in time t6 and point in time t7. In the repetition, the second execution of second task T2 for the fourth execution of first task T1 is interrupted between points in time t8 and t9 in order to carry out the fourth repetition of first task T1. The repetition of second task T2 is continued at point in time t9 and ends at a point in time t11. The second counter content is set to 0 and data transmission interval K is repeated at point in time t11. The repetition of data transmission interval K ends at point in time t12. The first counter content is set to 2 at point in time t12. The second counter content is set to 1 at point in time t12.

Access to first 5 ms buffer B51 and second 5 ms buffer B52 is allowed between points in time t1 and t4, and t6 and t9. Access to a first 10 ms buffer B101 and a second 10 ms buffer B102 is allowed between points in time t1 and t10, and t6 and t11. The access from the 5 ms task takes place in the example between t1 and t2, t3 and t4, t6 and t7, and t8 and t9, i.e., during the executions of first task T1. The access from the 10 ms task takes place in the example between t2 and t10, i.e., during the first execution of second task T2, and t6 and t7, i.e., preemptively prior to the execution of the repetition of second task T2. Access to all buffers for the tasks is denied in data transmission interval K. The access from the tasks to first 5 ms buffer B51 and to first 10 ms buffer B101 is illustrated by unidirectional arrows in FIG. 1. The access from the tasks to the other buffers is illustrated by bidirectional arrows in FIG. 1. In data transmission interval K, writing takes place from second 5 ms buffer B52 onto second 10 ms buffer B102, and from first 10 ms buffer B101 onto first 5 ms buffer B51.

Status variable S has state PROC_ACTIVE between points in time t1 and t4.

Status variable S has state TRANS_ACTIVE between points in time t4 and t5, between which first state counter Z1 has the first state value 0 and second state counter Z2 has the second state value 0.

Status variable S has state TRANS_COMPLETE between points in time t5 and t6.

Status variable S has state PROC_ACTIVE between points in time t6 and t11.

Status variable S has state TRANS_ACTIVE between points in time t11 and t12, between which first state counter Z1 has the first state value 0 and second state counter Z2 has the second state value 0.

Status variable S has state TRANS_COMPLETE beginning at point in time t12 in FIG. 1.

Since the communication takes place in the context of the tasks, in this scenario PROC_COMPLETE is a purely logical status that is dispensed with in the direct transition from PROC_ACTIVE to TRANS_ACTIVE.

During an actual execution of tasks, the communication interval that is actually required for a complete execution of the tasks and the communication can differ from the communication interval due to the stated errors. Error handling is described with reference to FIGS. 2 and 3. For elements that have already been described with reference to FIG. 1, the same reference numerals are used, and reference is made to the description of FIG. 1.

In contrast to the situation illustrated in FIG. 1, an interruption of the second execution of first task T1 takes place at a point in time t20 during the first repetition of first logical interval I1, as illustrated in FIG. 2. The second execution is continued at a point in time t21 prior to point in time t6, and ends at a point in time t22 prior to point in time t6. Data transmission interval K is started at point in time t6. Data transmission interval K ends at a point in time t23, which in the example is after point in time t6. This means that data transmission interval K ends after the start of the second repetition of first logical interval I1.

The second execution of second task T2 begins at point in time t23. The second execution of second task T2 thus obtains the most recent data from first task T1. The third execution of first task T1 is suppressed in the third repetition of first interval I1. The second execution of second task T2 can thus be concluded prior to the conclusion of the third repetition of first interval I1.

In contrast to the situation illustrated in FIG. 1, an interruption of the first execution of second task T2 takes place at point in time t3 during the first repetition of first logical interval I1, as illustrated in FIG. 3. The second execution of first task T1 is started at a point in time t30 after point in time t3, and ends at a point in time t31 prior to point in time t6, i.e., during the first repetition of first logical interval I1. The first execution of second task T2 is continued at point in time t31. The first execution of second task T2 is interrupted once again at point in time t6 in order to carry out the third execution of first task T1 up to a point in time t32. The first execution of second task T2 is continued at point in time t32, and ends at a point in time t33 prior to point in time t8. The fourth execution of first task T1 begins at point in time t8. The fourth execution of first task T1 ends at a point in time t34. Data transmission interval K is started at point in time t34. Data transmission interval K ends at a point in time t35.

The second execution of second task T2 is suppressed in the repetition of logical second interval I2.

The computing system is deterministically relieved of load by suppressing, i.e., omitting, the particular execution. An exceedance of a logical interval limit by a task involved in an execution is referred to below as a task deadline violation. As a response to such a task deadline violation, a failure occurs in the next periodic task execution by the communication infrastructure.

In principle, a distinction is to be made between two variants.

In variant 1, the deadline violation takes place during the last execution of a task in the data transmission interval. In variant 1 a distinction is made between two further variants 1A and 1B. In variant 1A, the deadline violation already takes place prior to the start of a transaction. One of the involved tasks has already started with the computation in the new interval. The status goes from PROC_ACTIVE into the new data transmission interval. The updating of the buffers is dispensed with. In variant 1B, updating of the buffers already takes place here, as illustrated in FIG. 2.

Status TRANS_ACTIVE is set while a deadline violation is taking place. Cooperative scheduling ensures that the communication is fully concluded before the first task execution takes place in the new interval.

in variant 2, the deadline violation does not take place during the last execution of a task in the data transmission interval. In variant 2, only the counter contents that have been corrupted by the failure of the task execution are corrected. This has no effect on the communication.

FIG. 4 illustrates a communication method for a communication corresponding to the "parallel cross core" category. With regard to the elements having the same reference numerals, reference is also made to the description of FIG. 1.

In contrast to the examples described above, tasks are also computed in parallel. In addition, the communication in data transmission interval K is carried out by a module 400 for communicating the data to be communicated using a direct memory access (DMA) or using interrupt service routines. A first trigger 301 is used to start data transmission interval K, and a second trigger 302 is used to start the repetition of data transmission interval K.

Deterministic processing is ensured by transferring the communication task to one or multiple entities such as DMA hardware or ISRs. The entities can likewise be prioritized, depending on the requirements, and allow a distribution of the communication load over further processor cores or dedicated hardware resources.

As illustrated in FIG. 4, only the activation of the updating takes place in each case with respect to the tasks. The actual updating of the buffers is carried out by another entity. Since all involved tasks can run completely in parallel, the status must be checked at the start of an execution.

In the case of TRANS_ACTIVE, the execution is delayed until the updating of the data is concluded. This is achieved by Busy Wait when a basic task model is used. State TRANS_COMPLETE is set solely in the context in which the updating takes place.

Figure 5:
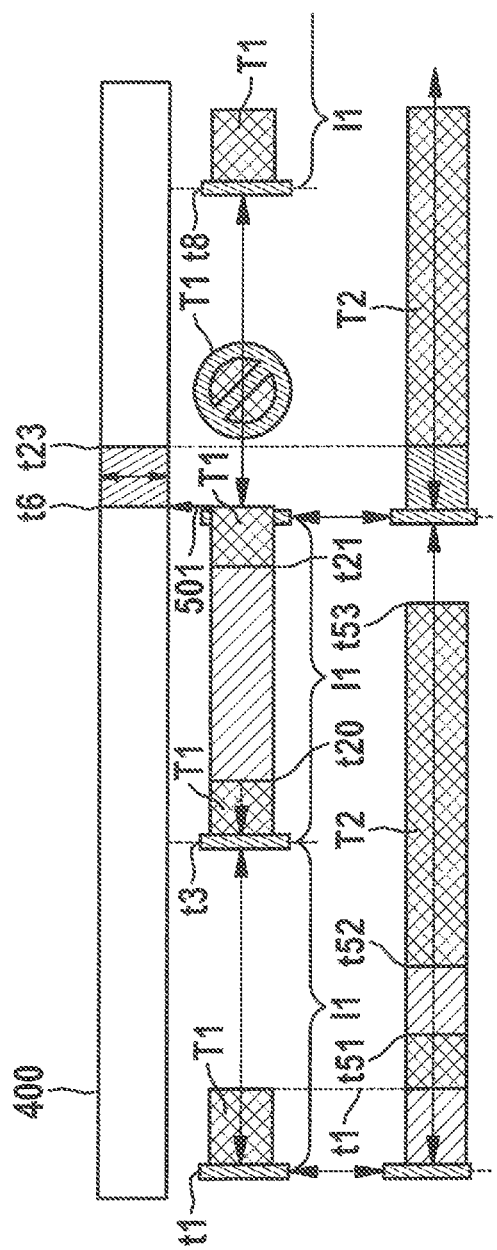
FIG. 5 schematically shows a third error handling concept according to an example embodiment of the present invention.

In this case, an error handling concept for the sporadic failure of task executions for a communication is possible, which corresponds to the "parallel cross core" category. This is explained in greater detail with reference to FIGS. 5 and 6. With regard to the elements having the same reference numerals, reference is also made to the description of FIG. 2.

In contrast to the examples described above, the first execution of the second task is interrupted at a point in time t51 after point in time t2, and is continued at a point in time t52 prior to point in time t3. In addition, the first execution of second task T2 ends at a point in time t53, after point in time t3 and point in time t20 and prior to point in time t21. This means that in this example, first tasks and second tasks are computed in parallel, at least temporarily.

In addition, the communication in data transmission interval K is carried out by module 400 for communicating the data to be communicated using direct memory access (DMA) or using interrupt service routines. A third trigger 501 that is triggered at the end of the second execution of first task T1 is used to start data transmission interval K.

Figure 6:
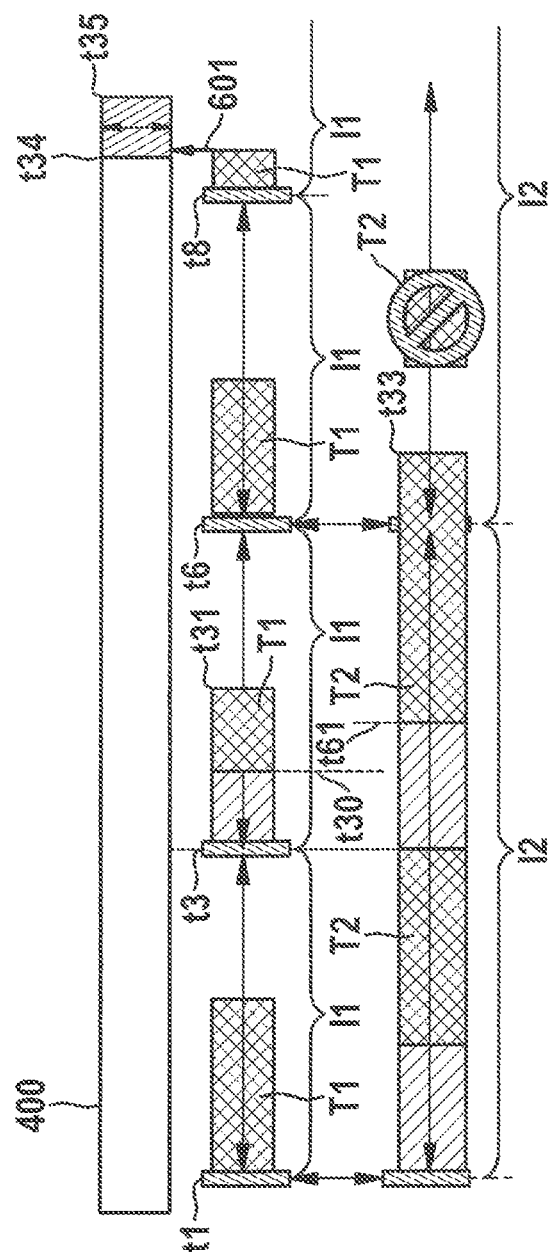
FIG. 6 schematically shows a fourth error handling concept according to an example embodiment of the present invention.

FIG. 6 illustrates a communication as shown in FIG. 3. With regard to the elements having the same reference numerals, reference is made to the description of FIG. 3.

In contrast to the examples described above, the first execution of second task T2 is continued not at point in time t31, but already at a point in time t61 that is before point in time t31 and after point in time t30. In addition, the first execution of second task T2 is not interrupted at point in time t6. This means that in this example, first tasks and second tasks are computed in parallel, at least temporarily.

In contrast to the examples described above, the communication in data transmission interval K is carried out by module 400 for communicating the data to be communicated using direct memory access (DMA) or using interrupt service routines. A fourth trigger 601 that is triggered at the end of the fourth execution of first task T1 is used to start data transmission interval K.

FIG. 7 illustrates a communication for an error handling concept for a sporadic failure of task executions for a communication, which corresponds to the "preemptive core local" category. With regard to the elements having the same reference numerals, reference is also made to the description of FIG. 1.

In the example described below with reference to FIG. 7, tasks are computed sequentially. First tasks T1 are computed with a higher priority than second tasks T2. This means that the scheduler interrupts an execution of a second task T2 as soon as a computation of a first task T1 is required according to the schedule of the scheduler.

In the example, first logical interval I1 and second logical interval I2 begin synchronously at a point in time t1 in the time sequence illustrated in FIG. 7. The first counter content is at the value 2 at the start, and the second counter content is at the value 1 at the start. Status variable S has state TRANS_COMPLETE prior to point in time t1, and has state PROC_ACTIVE beginning at point in time t1. Due to the prioritization, the first execution of first task T1 begins at point in time t1 and ends at a point in time t2. The first counter content is set to 1 at point in time t1. The execution of second task T2 begins at point in time t2, and is interrupted at a point in time t3 at which the first repetition of first logical interval I1 begins simultaneously with the second execution of first task T1. The second execution of first task T1 ends and the first counter content is set to 0 at a point in time t4. The execution of second task T2 is continued at point in time t4 and ends at a point in time t5, at which the second counter content is set to 0. Status variable S is set to value PROC_COMPLETE at point in time t5.

Since the execution of second task T2 ended after the second execution of first task T1, data transmission interval K does not begin until a point in time t6, at which the second repetition of first logical interval I1 and the repetition of second logical interval I2 begin synchronously. Status variable S is set to TRANS_ACTIVE between points in time t6 and t7. The third execution of first task T1 begins at a point in time t7 at the end of data transmission interval K. The first counter content is set to 2, the second counter content is set to 1, and status variable S is set to PROC_ACTIVE at point in time t7.

The third execution of first task T1 ends at a point in time t8, at which the first counter content is set to 1. The repetition of the execution of second task T2 begins at point in time t8 and ends at a point in time t9, at which the second counter content is set to 0. The third repetition of first logical interval I1 and the fourth execution of first task T1 begin at a point in time t10 that follows point in time t9. The fourth execution of first task T1 ends at a point in time t11. The first counter content is set to 0. Since the repetition of second task T2 is already concluded at point in time t11, status variable S is set to state TRANS_ACTIVE. The repetition of the communication interval begins at point in time t11 and ends at point in time t12. Status variable S is set to state TRANS_COMPLETE at point in time t12. The first counter content is set to the value 2, and the second counter content is set to the value 1. The access of the tasks to the buffers takes place during the executions of the tasks as described above.

In this case, an error handling concept is possible which is explained in greater detail with reference to FIG. 8 and FIG. 9. With regard to the elements having the same reference numerals, with regard to FIG. 8 reference is also made to the description of FIG. 2, and with regard to FIG. 9, reference is also made to the description of FIG. 3.

In the example illustrated in FIG. 8, first task T1 is executed with higher priority than second task T2. The second execution of the first task T1 ends at point in time t22. Data transmission interval K begins at point in time t22. This point in time t22 is just before point in time t6, at which the second repetition of first interval I1 is to begin. Thus, data transmission interval K still starts during second logical interval I2, but lasts past point in time t6 up to point in time t23. The repetition of second task T2 is thus delayed until the end of data transmission interval K, i.e., until point in time t23. Despite the higher priority of first task T1, in this case second task T2 is executed without interruption, since first task T1 is omitted in the second repetition of first interval I1. This means that, although first task T1 is executed with higher priority, for error handling, first task T1 is omitted when this is necessary.

In the example illustrated in FIG. 9, first task T1 is executed with higher priority than second task T2. The execution of second task T2 lasts until point in time t33, which is after point in time t6, i.e., within the repetition of second logical interval I2. Second task T2 is executed until it ends. Since data transmission interval K has not yet been executed, the repetition of second task T2 is not carried out and instead is dispensed with, regardless of the task priorities.

When the scheduling error uses buffers of a channel prior to its initialization, in which, for one of the load-dependent errors a) a task end is exceeded (for multiple task activation), b) communication was not ended in the most recent data transmission interval, or c) communication was not carried out in the most recent data transmission interval, or, for the memory error, a) a damaged state of the channel has been recognized, in the examples either a task fails, or data transmission interval K is shifted. In the example, a task fails due to its execution not being activated by the scheduler. The data transmission interval in the example is thus shifted, in that the scheduler activates the execution of the tasks and of the data transmission interval at the appropriate points in time.

The use of individual communication methods and error handling concepts is not limited to the listed "concurrency level" categories. They can also find application in other scenarios or categories such as "sequential core local" or "sequential cross core."

The communication methods and error handling concepts are not limited to a communication between two tasks. An execution with more than two tasks is dispensed with in the figures for the sake of clarity.

Figure 10:
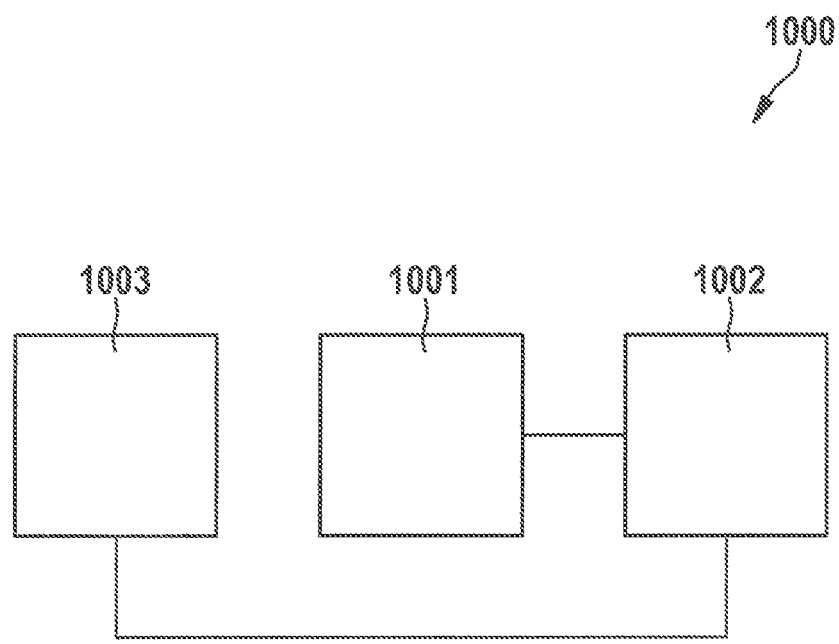
FIG. 10 schematically shows a device for communication according to an example embodiment of the present invention.

A device 1000 for communication is illustrated in FIG. 10. Device 1000 includes a processor 1001 and at least one temporary data memory 1002, which are designed for communicating data to be communicated between first task T1 and a second task T2, according to the described method, in data transmission interval K by reading from first data area B51, B52 of the at least one temporary data memory 1002, and storing the read data in second data area B101, B102 of the at least one temporary data memory 1002.

In an example, the device includes a module 1003 that is designed, as described for module 400, for communicating the data to be communicated using a direct memory access (DMA) or using interrupt service routines.

What is claimed is:

1. A method for error handling in a communication in which data are communicated between a first task and a second task in a data transmission interval by reading from a first data area for temporary data storage and storing the read data in a second data area for temporary data storage, wherein a first cyclically repeating time interval, which is for executing the first task, and a second cyclically repeating time interval, which is for executing the second task, are predefined, the method comprising:
   controlling hardware such that:
      (a) an execution of the first task is omitted in a pending instance of the second time interval responsive to a determination that the data transmission interval immediately prior to the pending instance of the second time interval began in, and continued past an end point in time of, a most recent instance of the first time interval, which was during an immediately preceding instance of the second time interval; or
      (b) an execution of the second task is omitted in the pending instance of the second time interval responsive to a determination that a most recent prior execution of the second task began in, and continued past an end point in time of, a most recent instance of the second time interval immediately prior to the pending instance of the second time interval.

2. The method of claim 1, wherein a respective start of each instance of the data transmission interval is triggered by (a) a respective end of a respective execution of the first task that is later than an execution of the second task of a same instance of the second time interval as that of the respective execution of the first task, or (b) a respective end of a respective execution of the second task that is later than a final execution of the first task in a same instance of the second time interval as that of the respective execution of the second task.

3. The method of claim 2, further comprising, when (a) an execution of the first task continues past an end of an instance of the second time interval in which the execution of the first task began and (b) a start of the data transmission interval is triggered by the end of the execution of the first task, delaying an execution of the second task immediately following the execution of the first task until an end of the data transmission interval.

4. The method of claim 2, wherein the hardware is controlled such that, when an execution of the second task continues past an end of an instance of the second interval in which the execution of the second task began, the data transmission interval is omitted in a pending instance of the second interval.

5. The method of claim 2, wherein the data to be communicated in the data transmission interval are communicated by one or multiple entities external to hardware that executes the first and second tasks.

6. The method of claim 1, wherein a duration of the second time interval is an integral multiple of a duration of the first time interval, with a respective set of a plurality of instances of the first interval occurring during each instance of the second time interval, an earliest of the plurality of instances of the first time interval beginning simultaneously with the respective instance of the second time interval.

7. The method of claim 1, wherein at least one instance of the first time interval begins during each instance of the second time interval, with no two instances of the first time interval overlapping in time, and wherein the data transmission interval in a respective instance of the second time interval either ends in an earliest of the instances of the first time interval of the respective instance of the second time interval prior to a first execution of the first task during the respective instance of the second time interval or begins in a latest of the instances of the first time interval of the respective instance of the second time interval after an end of a most recent execution of the first task.

8. The method of claim 1, further comprising determining a status variable as a function of a first state, which is of the execution of the first task, and as a function of a second state, which is of the execution of the second task, and starting the data transmission interval based on a value of the status variable.

9. The method of claim 8, further comprising when the first task, in an instance of the second time interval, fails because one of a plurality of executions of the first task that is to run during the respective instance of the second time interval, other than a last of the plurality of executions of the first task that is to run during the respective instance of the second time interval, is not ended by a time of an end of an instance of the first time interval that is associated with the respective execution of the first task, correcting a first state counter to a state that the first state counter would have during execution of the failed first task.

10. The method of claim 1, further comprising:
determining a status variable as a function of priorities that are associated with the first task and the second task; and
when whichever of the first and second tasks that is associated with a lowest of the priorities is executed as a last task in one of the instanced of the second time interval, shifting a start of the data transmission interval immediately following an end of the last task into an immediately following instance of the second time interval.

11. A device for error handling in a communication, the device comprising:
a processor; and
at least one temporary data memory for communicating data between a first task and a second task executed by the processor during a data transmission interval by reading from a first data area of the at least one temporary data memory and storing the read data in a second data area of the at least one temporary data memory;
wherein the processor is configured to perform a control such that:
(a) an execution of the first task is omitted in a pending instance of the second time interval responsive to a determination that the data transmission interval immediately prior to the pending instance of the second time interval began in, and continued past an end point in time of, a most recent instance of the first time interval, which was during an immediately preceding instance of the second time interval; or
(b) an execution of the second task is omitted in the pending instance of the second time interval responsive to a determination that a most recent prior execution of the second task began in, and continued past an end point in time of, a most recent instance of the second time interval immediately prior to the pending instance of the second time interval.

12. The device of claim 11, wherein the device includes a module for communicating the data using a direct memory access (DMA) or with using interrupt service routines.

13. The device of claim 11, wherein the processor is configured to perform the control such that the execution of the first task is omitted in the pending instance of the second time interval responsive to the determination that the data transmission interval immediately prior to the pending instance of the second time interval began in, and continued past an end point in time of, the most recent instance of the first time interval, which was during the immediately preceding instance of the second time interval.

14. The device of claim 11, wherein the processor is configured to perform the control such that the execution of the second task is omitted in the pending instance of the second time interval responsive to the determination that the most recent prior execution of the second task began in, and continued past the end point in time of, the most recent instance of the second time interval immediately prior to the pending instance of the second time interval.

15. The device of claim 11, wherein the processor is configured to perform the control such that the execution of the second task is omitted throughout an entirety of the pending instance of the second time interval responsive to the determination that the most recent prior execution of the second task began in, and continued past the end point in time of, the most recent instance of the second time interval immediately prior to the pending instance of the second time interval.

16. The method of claim 1, wherein the controlling of the hardware is performed such that the execution of the first task is omitted in the pending instance of the second time interval responsive to the determination that the data transmission interval immediately prior to the pending instance of the second time interval began in, and continued past an end point in time of, the most recent instance of the first time interval, which was during the immediately preceding instance of the second time interval.

17. The method of claim 1, wherein the controlling of the hardware is performed such that the execution of the second task is omitted in the pending instance of the second time interval responsive to the determination that the most recent prior execution of the second task began in, and continued past the end point in time of, the most recent instance of the second time interval immediately prior to the pending instance of the second time interval.

18. The method of claim 1, wherein the controlling of the hardware is performed such that the execution of the second task is omitted throughout an entirety of the pending instance of the second time interval responsive to the determination that the most recent prior execution of the second task began in, and continued past the end point in time of, the most recent instance of the second time interval immediately prior to the pending instance of the second time interval.

* * * * *